May 7, 1968  W. H. RUDDER  3,382,120
VARICOLORED SIDEWALL TIRE
Filed Dec. 18, 1964

INVENTOR.
WALTER H. RUDDER
BY
J.B. Holden
ATTORNEY

3,382,120
VARICOLORED SIDEWALL TIRE
Walter H. Rudder, Akron, Ohio, assignor to The Goodyear Tire & Rubber Company, Akron, Ohio, a corporation of Ohio
Filed Dec. 18, 1964, Ser. No. 419,340
3 Claims. (Cl. 156—116)

ABSTRACT OF THE DISCLOSURE

A plurality of contrasting decorative bands are provided on the sidewall of a tire by placing on the sidewall of a tire carcass, while the latter is in its cylindrical uncured state, a pair of layers contrasting in color with each other and with the black portions of the tire, curing the tire to bond together the several layers, and after the cure, exposing a portion of each of the contrastingly colored layers.

---

This disclosure relates to pneumatic tires and particularly it relates to a tire sidewall construction containing a plurality of colors and to an improved method of making a varicolored sidewall tire.

Pneumatic tires have for several years been enhanced in appearance by incorporating white sidewalls on the tire carcass. In addition to all-white sidewalls, colored sidewalls have been fabricated with varying degrees of success. One of the methods heretofore employed in making colored sidewall tires was to manufacture a white sidewall tire then apply a colored stain to the white rubber, thus achieving the desired color in the completed tire. Vari-colored tire sidewalls have also been made by incorporating a strip of one color of rubber on the tire carcass while it is in the drum configuration, then adding an additional strip in overlapping relationship thereto comprised of a different color. The above methods of creating a varicolored sidewall tire do not, however, lend themselves well to the production of tires by modern techniques, nor do they product a sidewall that wears well. Not only must the colors utilized in a pneumatic tire have a high degree of reproducibility but also they must be of such a nature that they are not subject to fading as was the case when additives or paints were incorporated in the tire subsequent to vulcanization.

A problem associated with positioning strips of different colored rubber about the circumference of a tire carcass has resided in keeping perfect concentricity between the strips so that there is a minimum of overlapping of the colors when they are exposed in the finished tire.

The principal object of this invention is to provide a varicolored sidewall pneumatic tire having a minimum of radial distortion in the positioning of the colored rings after vulcanization.

Another object of the present invention is to provide a method of manufacturing a pneumatic tire with a varicolored sidewall that will not consume more production time than an ordinary white sidewall tire.

An additional object of the invention is to produce a pneumatic tire wherein a varicolored sidewall tire is produced by using a minimum of color producing rubber stock therein.

These and other objects of the present invention will be readily apparent when considered with the accompanying drawings and claims.

Figure 1:
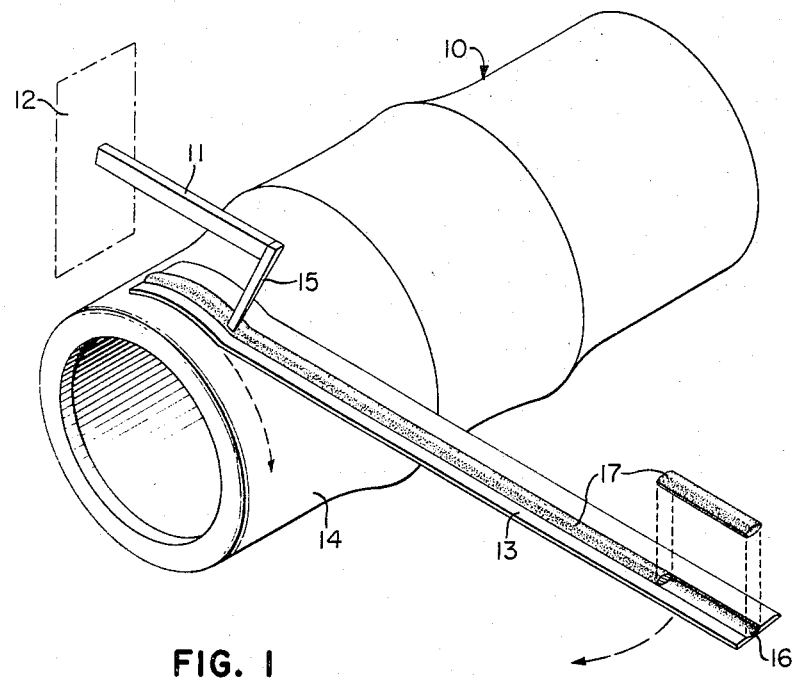
Figure 2:
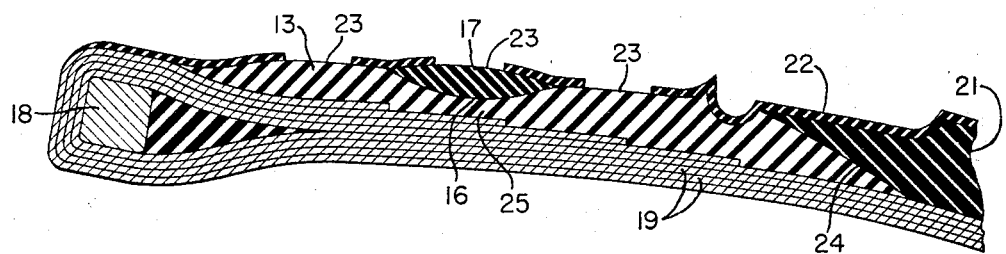

FIGURE 1 shows a perspective view of a tire during the manufacturing thereof. FIGURE 2 is a cross-section of a portion of a cured tire showing the relationship of the decorative rubber to the tire sidewall.

As has been stated before, there exists the problem of maintaining concentricity in manufacturing white sidewall tires and also in tires having a plurality of colors incorporated in the sidewall structure. The amount of exposed decorative surface in a tire has become quite narrow when compared with prior tire construction wherein practically the entire sidewall was made white, or colored. The now popular narrow decorative bands have required greater precision in the positioning of the sidewall material in the uncured tire. With the wide bands of decorative sidewall material heretofore used in the construction of tires the positioning of the uncured white stock could be made in a rather haphazard manner since only a portion of it would ordinarily be disposed in the finished tire. In the modern competitive tire of today the amount of pigmented rubber other than black is held to a minimum, thus reducing overall costs and minimizing adhesion problems inherent with pigmented compositions.

Referring to FIGURE 1 of the drawings, a tire in the uncured, or drum stage, is shown generally at 10. Only a portion of the apparatus utilized in the construction of a tire is shown at 11. The remainder of the apparatus is represented by 12. The drum upon which the uncured tire is fabricated has also been omitted for clarity because it is not considered to be part of this invention. After the reinforcement plies and beads have been positioned on the normally black tire carcass a strip of normally white sidewall stock 13 is positioned around the sidewall area 14 of tire 10. The white sidewall rubber stock is positioned by winding it circumferentially on the tire carcass while indexing one side visually with respect to the tip of a guide device such as 15. Upon completion of a revolution of the tire carcass upon the tire drum, the white rubber stock is butt spliced, or lap spliced so as to produce a minimum raised section. Heretofore when additional colored layers were desired they were installed on the tire carcass in a manner similar to that just described. The varicolored layers were either one on top of the other, each being the same width, or were positioned side by side in partial overlapping relationship.

It has been discovered that the positioning of additional colored strips of sidewall rubber can be accomplished with far more accuracy and with a minimum of time by the method of this invention which is discussed hereinafter. As white sidewall rubber stock 13 is extruded a groove or depression 16 is placed longitudinally along one side thereof. A colored strip of rubber stock conforming generally to the configuration of groove 16 is then positioned in groove 16 and stitched, or adhered, firmly in position. This sub-assembly can be accomplished by having a multiple head die extruder arrangement adapted to handle a plurality of colors, or else the colored strip can be positioned subsequent to removal of the white sidewall rubber from the area of the extruder. As can be seen from FIGURE 1, the relative width of color strip 17 is very narrow when compared to the overall width of white sidewall strip 13; therefore, it is possible to employ a plurality of different colored strips each embedded in a longitudinal groove placed in the white sidewall stock material. Since, as will be explained more fully hereinafter, the position of the colored strip, or strips, such as 17 is very critical from a dimensional standpoint, it has been found that more accurate control can be obtained when index device 15 is employed against the edge of color strip 17 rather than against the edge of white sidewall stock 13 as has heretofore been the accepted practice in building white sidewall tires.

FIGURE 2 shows in cross-section a part of a cured tire incorporating the improvement of this invention. A reinforcing bead generally constructed of metallic wire is shown at 18. The fabric reinforcing plies 19 are shown as they wrap around bead 18 and fold back upon themselves in the sidewall area of the tire. A typical 4-ply tire construction is depicted, however, the actual reinforcement can assume any form of ply, or radial construction. A white sidewall rubber stock is shown at 13. Tread stock 21 is shown in overlapping relationship with respect to white sidewall rubber 13. Groove 16 in white sidewall strip 13 is shown in its final configuration which is somewhat more flat, or linear, in cross-section than as shown in the uncured state of FIGURE 1. Colored rubber stock 17 has also assumed a somewhat flatter profile than before being subjected to the pressures encountered during the cured cycle to which the tire is subjected.

Normally when a narrow band of rubber is incorporated into a tire by placing it in overlapping relationship such as juncture 24 between white stock 13 and black tread stock 21, it will have a tendency to move out of position along the joint between the two layers when the tire is expanded from the cylindrical configuration of an uncured tire to the toroidal shape of a cured tire. In this invention the relatively narrow colored strip 17 is held in position by the broad base provided by white sidewall stock 13. The interconnecting bridge 25 of white sidewall stock 17 is also important in preventing the shifting of colored strip 17 during vulcanization of the tire.

FIGURE 2 also shows a black cover strip 22 that extends from tread stock 21 to bead area 18. After the tire has been vulcanized windows such as 23 are cut through over strip 22 by grinding, thus revealing the underlying color, or colors.

Since it is desirable to show as much as possible of color strip 17 yet utilize a minimum of colored stock it is very important to exactly position it. It has been found that this invention permits the positioning of colored strips with a precision heretofore not practically attainable.

Throughout the aforegoing description the invention has been described in terms of a colored strip superposed on a white strip. It is, of course, to be understood that the arrangement can be reversed so that the wider strip is dark colored and the narrow strip is of a lighter color.

While certain representative embodiments and details have been shown for the purpose of illustrating the invention, it will be apparent to those skilled in this art that various changes and modifications may be made therein without departing from the spirit or scope of the invention.

What is claimed is:
1. The method of building a varicolored tire comprising the steps of:
   (1) Forming a first layer of sidewall stock with a longitudinally oriented groove therein,
   (2) Forming a second layer of sidewall stock having a different color from said first layer and of a width as wide as the groove in said first layer of sidewall stock,
   (3) Uniting said first and second layers of sidewall stock by positioning the second layer in the groove of the first layer,
   (4) Applying one end of the combination of said first and second layers to the sidewall area of a tire carcass when in the fabrication stage,
   (5) Maintaining concentricity of said combination with respect to the tire carcass by indexing along an edge of said second layer of the sidewall stock,
   (6) Superposing at least over said layers a layer of overlay stock,
   (7) Curing the tire so that the respective layers are bonded together,
   (8) Removing selected widths of overlay stock from over said first and second layers of sidewall stock to form a tire having a plurality of concentric rings of different colors.

2. The method of building a varicolored sidewall tire comprising the steps of:
   (1) Forming a first layer of sidewall stock that contains a longitudinal groove therein,
   (2) Positioning said first layer around the sidewall area of a tire carcass during the building stage,
   (3) Forming a second layer of sidewall stock of different color than said first layer having a width corresponding to the width of the groove in said first layer,
   (4) Positioning said second layer of sidewall stock so that it is seated in the groove of the first layer,
   (5) Superposing over the sidewall area of an uncured tire carcass a layer of overlay stock,
   (6) Curing the tire so that the respective layers are bonded together,
   (7) Removing selected widths of overlay stock from said first and second layers of sidewall stock to form a tire having a plurality of concentric rings of contrasting colors.

3. The method of building a varicolored sidewall tire comprising the steps of:
   (1) Forming a first layer of continuous sidewall stock with at least two thickened portions interconnected with a thin web of sidewall stock,
   (2) Forming a second layer of sidewall stock of different color than said first layer and of less width and thickness than said first layer,
   (3) Forming a sub-assembly by placing said second layer contiguous with first layer at the thin portion thereof,
   (4) Training the sidewall sub-assembly circumferentially around an uncured tire carcass when in the uncured cylindrical form by indexing along an edge of said second layer.
   (5) Overlaying the sidewall stock with a cover strip layer of overlay stock,
   (6) Expanding the tire to toroidal form in a curing apparatus,
   (7) Curing the tire so that the respective layers are united by vulcanization,
   (8) Removing selected widths of overlay stock from said first and second layers to form a tire having a plurality of concentric rings of different colors.

References Cited

UNITED STATES PATENTS

| | | | |
|---|---|---|---|
| 1,940,077 | 12/1933 | Coe | 152—353 |
| 2,761,489 | 9/1956 | Kraft | 156—154 X |
| 3,218,208 | 11/1965 | Molen | 156—116 |
| 3,285,314 | 11/1966 | Roberts | 156—116 X |

EARL M. BERGERT, *Primary Examiner.*

HAROLD ANSHER, *Examiner.*

UNITED STATES PATENT OFFICE

CERTIFICATE OF CORRECTION

Patent No. 3,382,120                                    May 7, 1968

Walter H. Rudder

It is certified that error appears in the above identified patent and that said Letters Patent are hereby corrected as shown below:

In the heading to the drawing, line 2, and in the heading to the printed specification, line 2, "VARICOLORED SIDEWALL TIRE", each occurrence, should read -- METHOD OF BUILDING A VARICOLORED SIDEWALL TIRE --. Column 1, line 40, "product" should read -- produce --. Column 3, line 30, "over" should read -- cover --.

Signed and sealed this 9th day of December 1969.

(SEAL)
Attest:

Edward M. Fletcher, Jr.                        WILLIAM E. SCHUYLER, JR.
Attesting Officer                                   Commissioner of Patents